United States Patent
Akahori (10) Patent No.: US 8,181,947 B2
(45) Date of Patent: May 22, 2012

(54) SPRING ASSEMBLY

(75) Inventor: Shinsuke Akahori, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 734 days.

(21) Appl. No.: 11/887,380

(22) PCT Filed: Mar. 15, 2006

(86) PCT No.: PCT/JP2006/305086
§ 371 (c)(1),
(2), (4) Date: May 7, 2008

(87) PCT Pub. No.: WO2006/109392
PCT Pub. Date: Oct. 19, 2006

(65) Prior Publication Data
US 2009/0134559 A1 May 28, 2009

(30) Foreign Application Priority Data
Mar. 31, 2005 (JP) ................................. 2005-104213

(51) Int. Cl.
*F16F 1/12* (2006.01)
(52) U.S. Cl. .......... 267/179; 267/80; 267/157; 267/166; 267/169; 267/170; 267/209
(58) Field of Classification Search ................ 267/179, 267/72, 74, 89, 91, 157, 169, 170, 171, 80, 267/202, 208, 209, 210, 211, 235, 238; *F16F 3/04, F16F 15/067, 1/12; F16B 1/02; F16D 25/14*
See application file for complete search history.

(56) References Cited

U.S. PATENT DOCUMENTS
2,406,064 A * 8/1946 Dath .............................. 267/209
(Continued)

FOREIGN PATENT DOCUMENTS
DE 71 12 269 U 8/1971
(Continued)

OTHER PUBLICATIONS
Chinese Office Action dated Nov. 7, 2008 with English-Language Translation.
(Continued)

*Primary Examiner* — Robert Siconolfi
*Assistant Examiner* — San Aung
(74) *Attorney, Agent, or Firm* — McGinn IP Law Group, PLLC (57) ABSTRACT

To provide a spring assembly whose production cost is low. It includes a coil spring 1, and a pair of retainers 2 disposed respectively at opposite end portions of the coil spring 1, and the retainer 2 includes a plate member 3 abutting against the end portion of the coil spring 1 and depressed at a central portion thereof toward the inside of the coil spring 1, and a hook member 4 fixed to the plate member 3 so as to hold a free length of the coil spring 1 shortened. The hook member 4 includes a pillar portion 4b depending from the plate member 3 and extending into the inside of the coil spring 1, and a turned-back portion 4c turned back at a distal end of the pillar portion 4b so as to be engaged with the other turned-back portion 4c, and the turned-back portion 4c is disposed at a region offset from a center axis of the coil spring 1 in parallel relation thereto, and the pillar portion 4b and a distal end of the turned-back portion 4c are disposed along the center axis of the coil spring 1 in opposed relation to each other.

12 Claims, 8 Drawing Sheets

U.S. PATENT DOCUMENTS

| | | | |
|---|---|---|---|
| 2,558,116 A * | 6/1951 | Withall | 267/209 |
| 2004/0212131 A1 | 10/2004 | Costello et al. | |
| 2004/0214475 A1 * | 10/2004 | Costello et al. | 439/700 |
| 2004/0222578 A1 | 11/2004 | Bourgois et al. | |

FOREIGN PATENT DOCUMENTS

| | | | |
|---|---|---|---|
| DE | 20218768 | * | 4/2003 |
| JP | 61-120854 | | 6/1986 |
| JP | 3-49436 | | 5/1991 |
| JP | 8-4314 | | 1/1996 |
| JP | 11-22771 | | 1/1999 |
| JP | 3497063 | | 11/2003 |
| WO | WO 02/088566 A2 | | 11/2002 |
| WO | WO 02/088566 A3 | | 11/2002 |

OTHER PUBLICATIONS

European Search Report dated Jun. 24, 2009.

* cited by examiner

SPRING ASSEMBLY

TECHNICAL FIELD

This invention relates to a spring assembly used, for example, in an accumulator serving as a hydraulic control element in an automatic transmission of an automobile or the like, and more specifically to a spring assembly in which a coil spring can be held in a shortened condition smaller than its free length.

BACKGROUND ART

Although not specifically shown, a conventional spring assembly of this kind is constructed such that it includes a compression coil spring, a pair of sheets abutting respectively against opposite end portions of the compression coil spring, a pair of loop-like wires for imparting precompression to the compression coil spring, a pair of bushes having opposite ends of the respective loop-like wires fixedly embedded therein and fitted respectively in holes in the respective sheets, and a plate mounted on one of the sheets so as to center the bush associated therewith (see, for example, Patent Document 1).

When this spring assembly is actually to be assembled, one loop-like wire and the other loop-like wire are combined together in an intersecting manner, and then the opposite ends of each loop-like wire are fixedly embedded in the corresponding bush, and each bush is fitted into the hole in the sheet. As a result, the distance between the pair of sheets is regulated, and the compression coil spring is held in a shortened condition smaller a predetermined amount than its free length.

Patent Document 1: Japanese Patent No. 3,497,063

DISCLOSURE OF THE INVENTION

Problem that the Invention is to Solve

Therefore, in the conventional spring assembly, the compression coil spring can be held in the free length-shortened condition after a fashion, but in contrast the number of the constituent parts of the assembly itself increases as described above, and in addition cumbersome operations, such as the operation for fixedly embedding the opposite ends of the wire in the bush and the operation for fitting the bush into the hole in the corresponding sheet, are required, and the production cost naturally has tended to increase.

Means for Solving the Problem

This invention has been developed in order to efficiently solve the problem with the above conventional spring assembly, and the invention recited in claim 1 wherein it includes a coil spring, and a pair of retainers disposed respectively at opposite end portions of the coil spring, and the retainer includes a plate member abutting against the end portion of the coil spring and depressed at a central portion thereof toward the inside of the coil spring, and a hook member fixed to the plate member so as to hold a free length of the coil spring shortened, and the hook member includes a pillar portion depending from the plate member and extending into the inside of the coil spring, and a turned-back portion turned back at a distal end of the pillar portion so as to be engaged with the other turned-back portion, and the turned-back portion is disposed at a region offset from a center axis of the coil spring in parallel relation thereto, and the pillar portion and a distal end of the turned-back portion are disposed along the center axis of the coil spring in opposed relation to each other.

The invention of claim 2 premised on claim 1 wherein a hole is formed through the depressed central portion of the plate member.

The invention of claim 3 premised on claim 2 wherein the hole in the plate member is formed into a slot-shape, and the turned-back portion of the hook member extends in a direction of a shorter dimension of the hole.

The invention of claim 4 premised on claim 2, wherein the hook member is formed by bending a metal plate, and the turned-back portion is narrower in plate width than the pillar portion, and also its width narrowing direction is such that the turned-back portion is narrowed in a direction to be disposed close to the center axis of the coil spring.

The invention of claim 5 premised on claim 1 wherein the plate member has a slot-shaped hole formed through its depressed central portion, and the turned-back portion of the hook member is extended in a direction of a shorter dimension of the hole, and the hook member is formed by bending a metal plate, and the turned-back portion is narrower in plate width than the pillar portion, and also its width narrowing direction is such that the turned-back portion is narrowed in a direction to be disposed close to the center axis of the coil spring.

This invention has been developed in order to efficiently solve the problem with the above conventional spring assembly, and the invention recited in claim 6 wherein it includes a coil spring, and a pair of retainers disposed respectfully at opposite end portions of the coil spring, wherein the retainer includes a plate member abutting against the end portion of the coil spring and depressed at a central portion thereof toward the inside of the coil spring, and a hook member fixed to the plate member so as to hold a free length of the coil spring shortened, the hook member includes a pillar portion depending from the plate member and extending into the inside of the coil spring, and a turned-back portion turned back at a distal end of the pillar portion so as to be engaged with the other turned-back portion, the turned-back portion is disposed at a region offset from a diametral line of the coil spring in parallel relation thereto, and the pillar portion and a distal end of the turned-back portion are disposed along a center axis of the coil spring in opposed relation to each other.

This invention has been developed in order to efficiently solve the problem with the above conventional spring assembly, and the invention recited in claim 7 wherein it includes a coil spring, and a pair of retainers disposed respectively at opposite end portions of the coil spring, the retainer includes a plate member abutting against the end portion of the coil spring and depressed at a central portion thereof toward the inside of the coil spring; and a hook member fixed to the plate member so as to hold a free length of the coil spring shortened, the hook member includes a pillar portion depending from the plate member and extending into the inside of the coil spring, and a turned-back portion turned back at distal end of the pillar portion so as to be engaged with the other turned-back portion, the turned-back portion is disposed at a region offset from a center axis of the coil spring in parallel relation thereto and offset from a diametral line of the coil spring in parallel relation thereto, the pillar portion and a distal end of the turned-back portion are disposed along the center axis of the coil spring in opposed relation to each other, and the hook members are inserted in opposite directions in the inside of the coil spring respectively from the opposite end portions thereof with the turned-back portions facing in the same direction, the plate members are caused to abut respectively against the opposite end portions of the coil spring from the outer sides thereof, thereafter the coil spring is compressed, one of the retainers is forcibly rotated through 90°, and thereafter the compression of the coil spring is released so as to engage one turned-back portion and the other turned-back portion in interesting relation to each other.

Advantages of the Invention

Therefore, in the invention of claim 1, the assembly includes the coil spring, and the pair of retainers each including the plate member and the hook member. In this connection, the number of the constituent parts is reduced as compared with the conventional structure, and therefore the production cost is lowered. In addition, merely by engaging the turned-back portion of one hook member with the turned-back portion of the other hook member in intersecting relation to each other, the coil spring can be held in a condition in which its free length is shortened, and therefore the assembling operation becomes quite easy. Furthermore, the retainer itself can be used commonly at the opposite ends of the coil spring, and in this respect, also, the production cost can be kept to a low level.

In the invention of claim 2, the hole is formed through the depressed central portion of the plate member, and in this connection even when the coil spring is compressed, for example, beyond the range of ½ of its free length, the turned-back portion of each hook member can be inserted into the hole in the plate member opposed thereto, and therefore the turned-back portion of the hook member and the plate member will not inadvertently interfere with each other.

In the invention of claim 3, the hole formed through the plate member is formed into the slot-shape, and the turned-back portion of the hook member extends in the direction of the shorter dimension of the hole. In this connection, when one retainer is rotated through 90° in the assembling operation, and the turned-back portions are engaged with each other in intersecting relation, each turned-back portion extends in the direction of the longer dimension of the hole in the plate member opposed thereto. Therefore, even if the turned-back portion is made as large as possible, this large turned-back portion will not interfere with the plate member, and also the amount of engagement between the turned-back portions in their engaged condition naturally increases, and therefore they will not be easily disengaged from each other by an impact as when the dropping occurs.

In the invention of claim 4, the turned-back portion is narrower in plate width than the pillar portion, and also its width narrowing direction is such that the turned-back portion is narrowed in the direction to be disposed close to the center axis of the coil spring. In this connection, even if the hole formed through the plate member is made small, the interference of the two with each other can be more positively prevented, and besides the point at which the turned-back portions of the hook members are engaged with each other in intersecting relation can be disposed as close to the center axis of the coil spring as possible, and therefore the coil spring can be held in the shortened condition in a proper posture without being buckled.

In the invention of claim 5, similarly to claims 2 to 4, even when the coil spring is compressed beyond the range of ½ of its free length, the turned-back portion of each hook member can be inserted into the hole in the plate member opposed thereto, and therefore the turned-back portion of the hook member and the plate member will not inadvertently interfere with each other. Furthermore, when one retainer is rotated through 90° in the assembling operation, and the turned-back portions are engaged with each other in intersecting relation, each turned-back portion extends in the direction of the longer dimension of the hole in the plate member opposed thereto. Therefore, even if the turned-back portion is made as large as possible, this large turned-back portion will not interfere with the plate member, and also the turned-back portions in their engaged condition will not be easily disengaged from each other, and furthermore even if the hole formed through the plate member is made small, the interference of the two with each other can be more positively prevented. In addition, the point at which the turned-back portions of the hook members are engaged with each other in intersecting relation can be disposed as close to the center axis of the coil spring as possible, and therefore the coil spring can be held in the shortened condition in the proper posture without being buckled.

BEST MODE FOR CARRYING OUT THE INVENTION

The present invention is directed to a spring assembly in which a coil spring is held in a shortened condition smaller than its free length, and it includes the coil spring, and a pair of retainers each including a plate member and a hook member, and with this construction the number of the constituent parts is reduced as much as possible, and also the assembling operation becomes easy, and the production cost is made low.

EMBODIMENT

Figure 1:
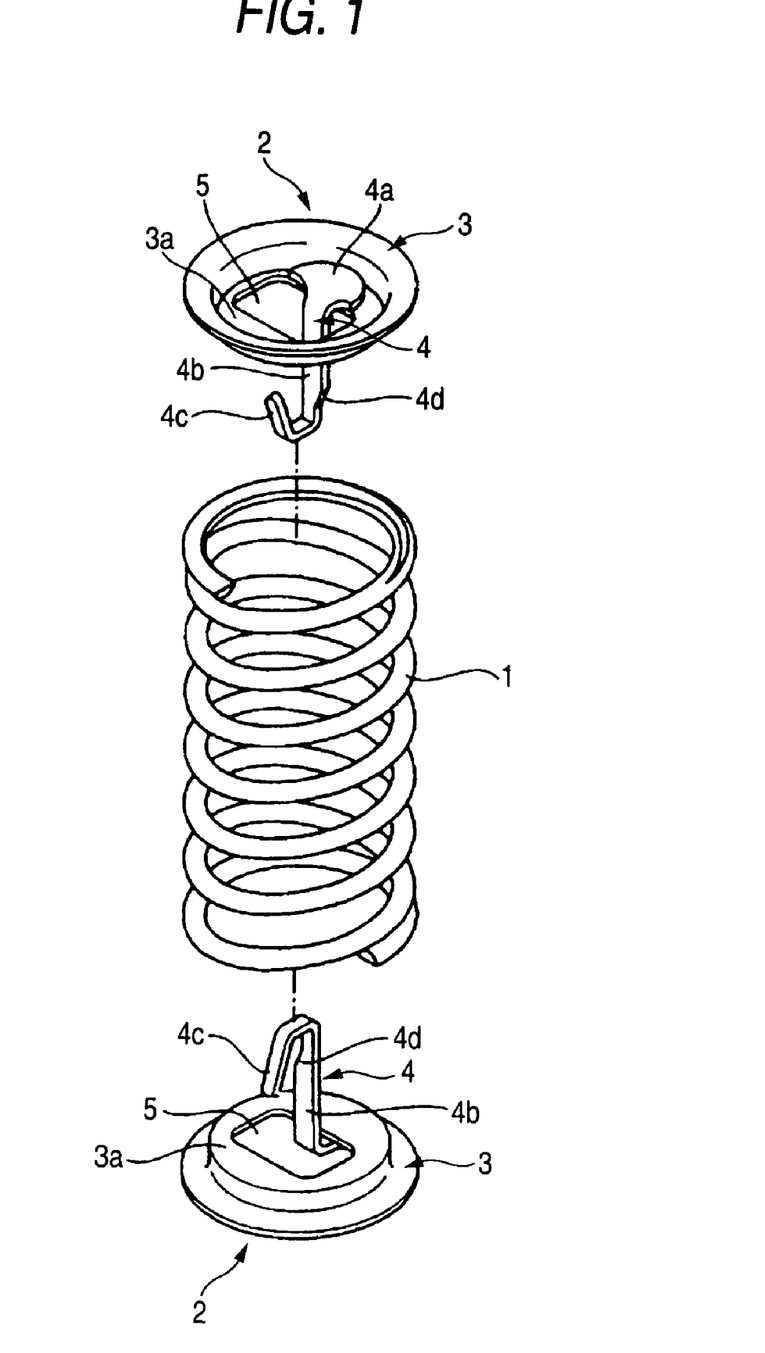
[FIG. 1] An exploded perspective view of an embodiment of a spring assembly of the present invention.

The present invention will now be described with reference to an illustrated preferred embodiment, and a spring assembly of this embodiment is used in an accumulator serving as a hydraulic control element in an automatic transmission of an automobile, and more specifically includes one compression coil spring 1 having a predetermined free length, and a pair of retainers 2 disposed respectively at opposite end portions of the compression coil spring 1, as shown in FIG. 1.

Figure 2A:
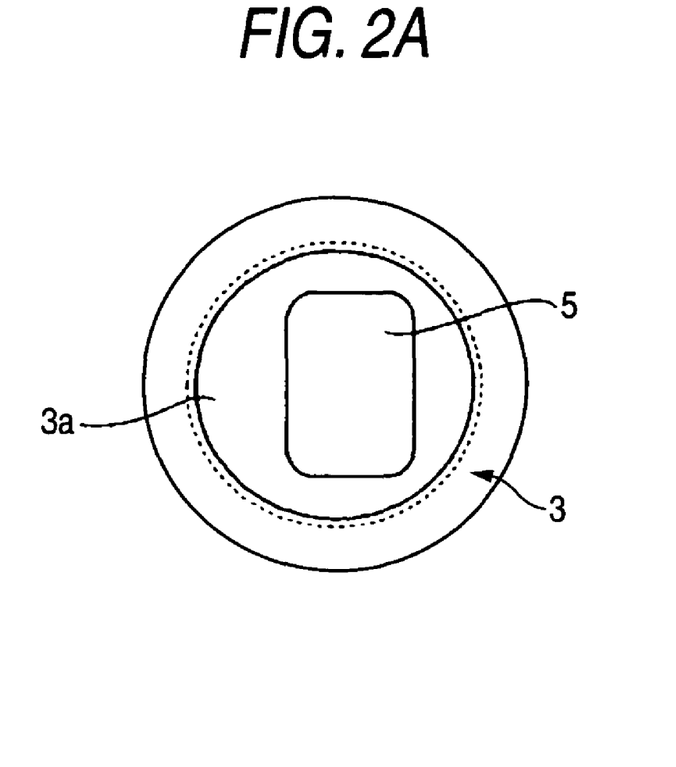
FIG. 2A is a plan view of a plate member.
Figure 2B:
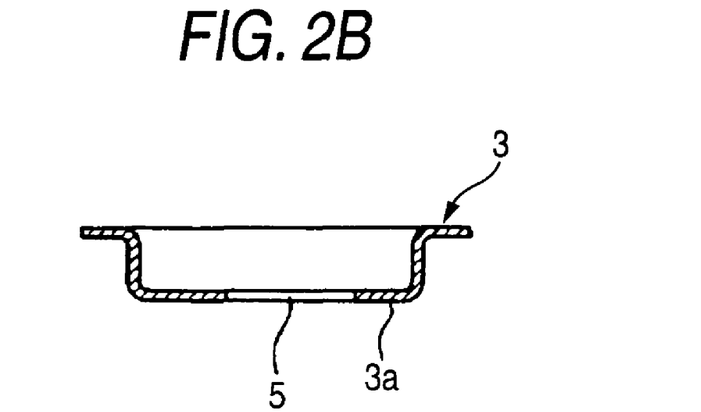
FIG. 2B is a vertical cross-sectional view of the same.

With respect to the pair of retainers 2, the retainer is so constructed as to be used commonly at the opposite ends of the compression coil spring 1, and includes a plate member 3 for abutting against the end portion of the compression coil spring 1 from the outside, and a hook member 4 fixed to the plate member 3 and extending into the inside of the compression coil spring 1. As shown also in FIGS. 2A and 2B, the former plate member 3 is formed by pressing a disc-like metal plate, and is constructed such that a central portion thereof is depressed toward the inside of the compression coil spring 1, and an outer periphery of the depressed central portion 3a is disposed to conform to a circular inner periphery of the compression coil spring 1, and further a slot 5 assuming a rectangular shape for avoiding interference with a turned-back portion 4c of the hook portion 4 described later is formed through the depressed central portion 3a.

Figure 3A:
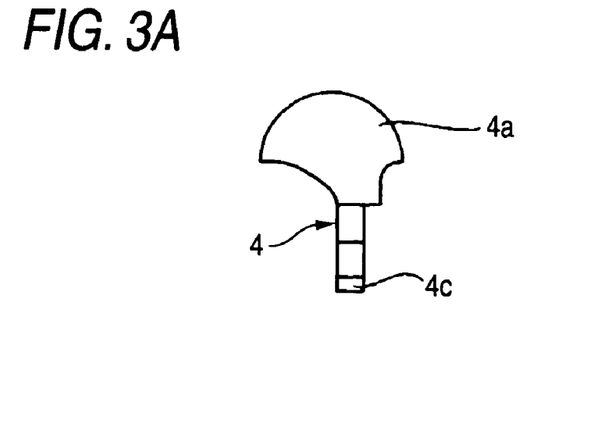
FIG. 3A is a plan view of a hook member.
Figure 3B:
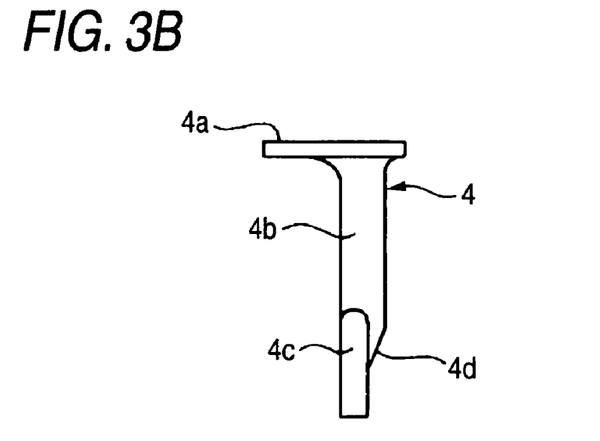
FIG. 3B is a front-elevational view of the same.
Figure 3C:
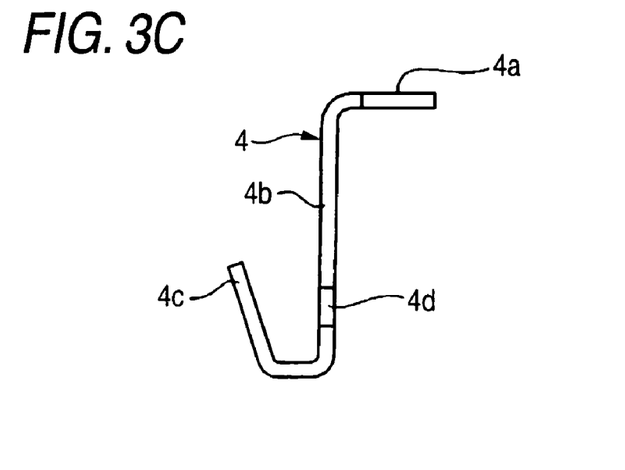
FIG. 3C is a side-elevational view of the same.

As shown also in FIGS. 3A to 3C, the latter hook portion 4 is formed by bending a rectangular metal plate, and includes a horizontal welding piece portion 4a to be welded to a slot edge portion of the slot 5 in the plate member 3, a pillar portion 4b depending from the welding piece portion 4a, and the turned-back portion 4c turned back from a distal end of the pillar portion 4b in a direction toward the welding piece portion 4a. Although the whole assumes a generally J-shape, the construction is such that the turned-back portion 4c is narrower in plate width than the pillar portion 4b, and also its width narrowing direction is such that the turned-back portion is narrowed with a tapering shape 4d in a direction to be disposed close to a center axis of the compression coil spring 1.

Figure 4A:
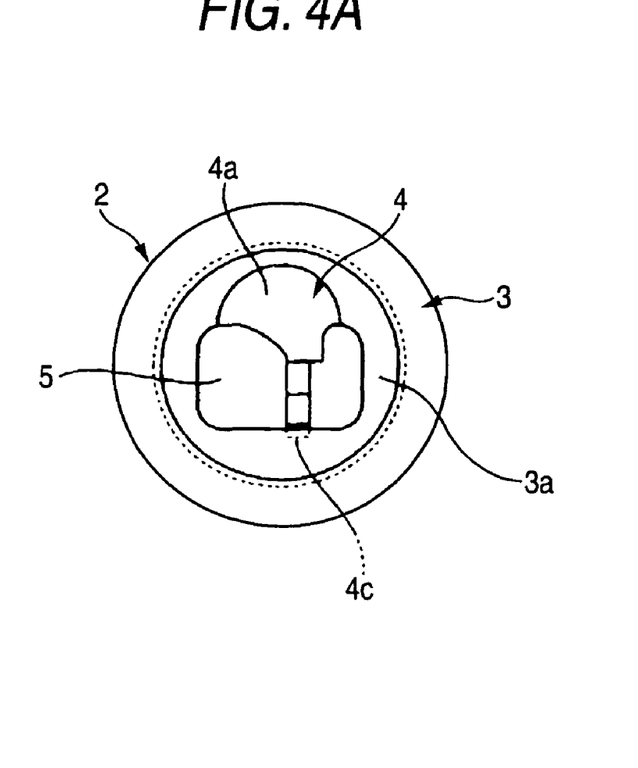
FIG. 4A is a plan view showing a condition in which the hook member is welded to the plate member.
Figure 4B:
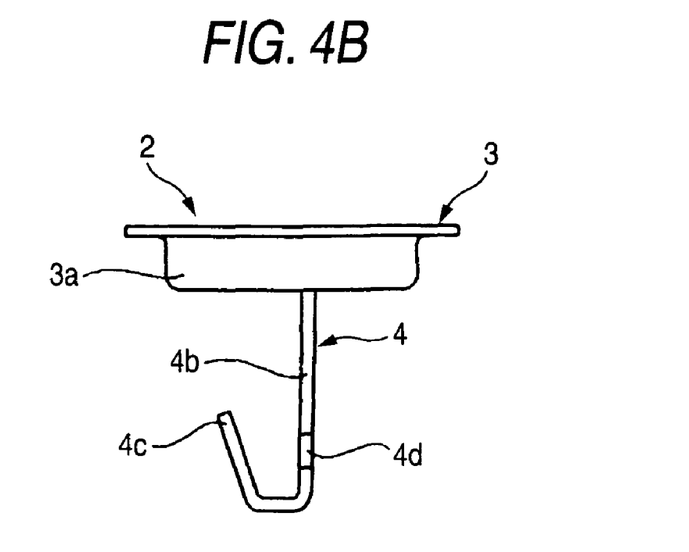
FIG. 4B is a side-elevational view showing this condition.

Therefore, for fixing this hook member 4 to the plate member 3, the welding piece portion 4a of the hook member 4 is welded to that portion of the plate member 3 disposed outwardly of the slot edge of the slot 5, and at this time the welding piece portion 4a is welded in slightly-offset relation to the center axis of the compression coil spring 1 as shown in FIGS. 4A and 4B so that the turned-back portion 4c is disposed at a region offset from the center axis of the compression coil spring 1 and also that the pillar portion 4b and the distal end of the turned-back portion 4c are disposed along the center axis of the compression coil spring 1 in opposed relation to each other. Therefore, in this welded condition, the turned-back portion 4c of the hook member 4 extends in a direction of the shorter dimension of the slot 5 in the corresponding plate member 3.

Figure 5:
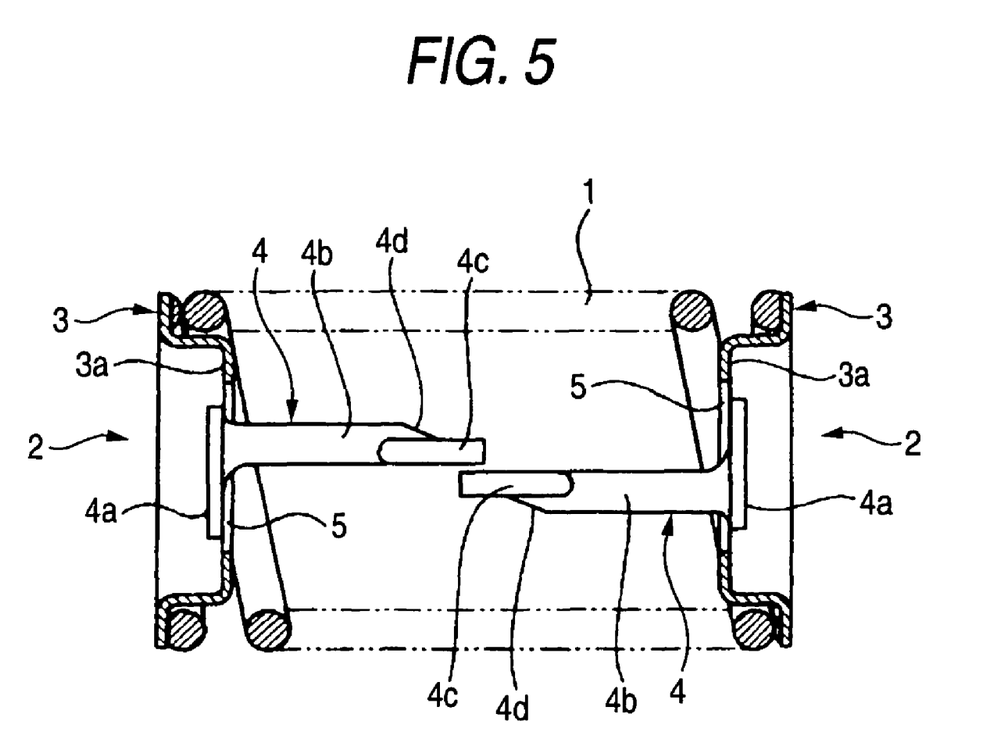
[FIG. 5] A cross-sectional view explanatory of a first stage of the assembling of the spring assembly.
Figure 6:
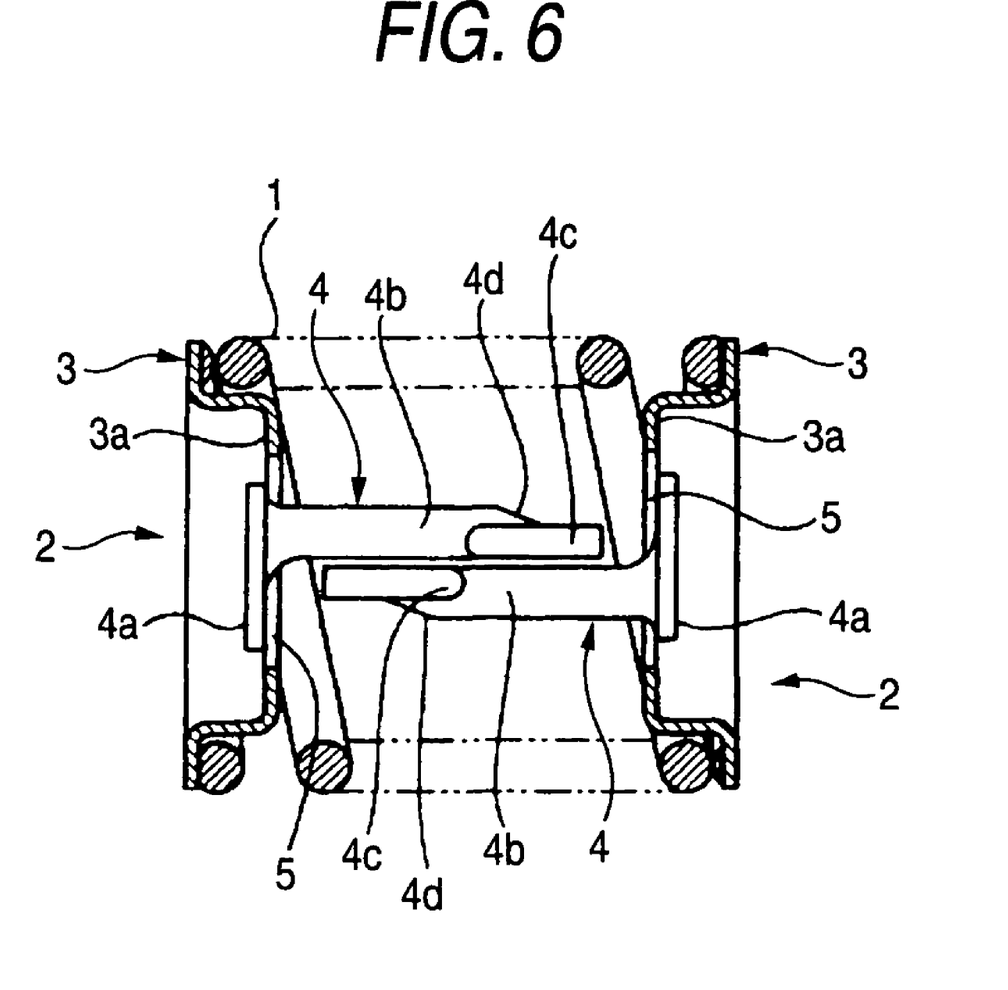
[FIG. 6] A cross-sectional view explanatory of a second stage of the assembling of the spring assembly.

Therefore, for assembling the spring assembly of this construction, first, as shown in FIG. 5, the hook members 4 of the retainers 2 are inserted in opposite directions in the inside of the compression coil spring 1 respectively from the opposite end portions thereof, with the turned-back portions 4c facing in the same direction, and the plate members 3 are caused to abut respectively against the opposite end portions of the compression coil spring 1 from the outer sides thereof, and thereafter in this condition, the compression coil spring 1 is compressed as shown in FIG. 6. Incidentally, in this case, each turned-back portion 4c is disposed at the region offset from the center axis of the compression coil spring 1, and therefore the hook members 4 will not interfere with each other, and the compression coil spring 1 can be smoothly compressed.

Figure 7:
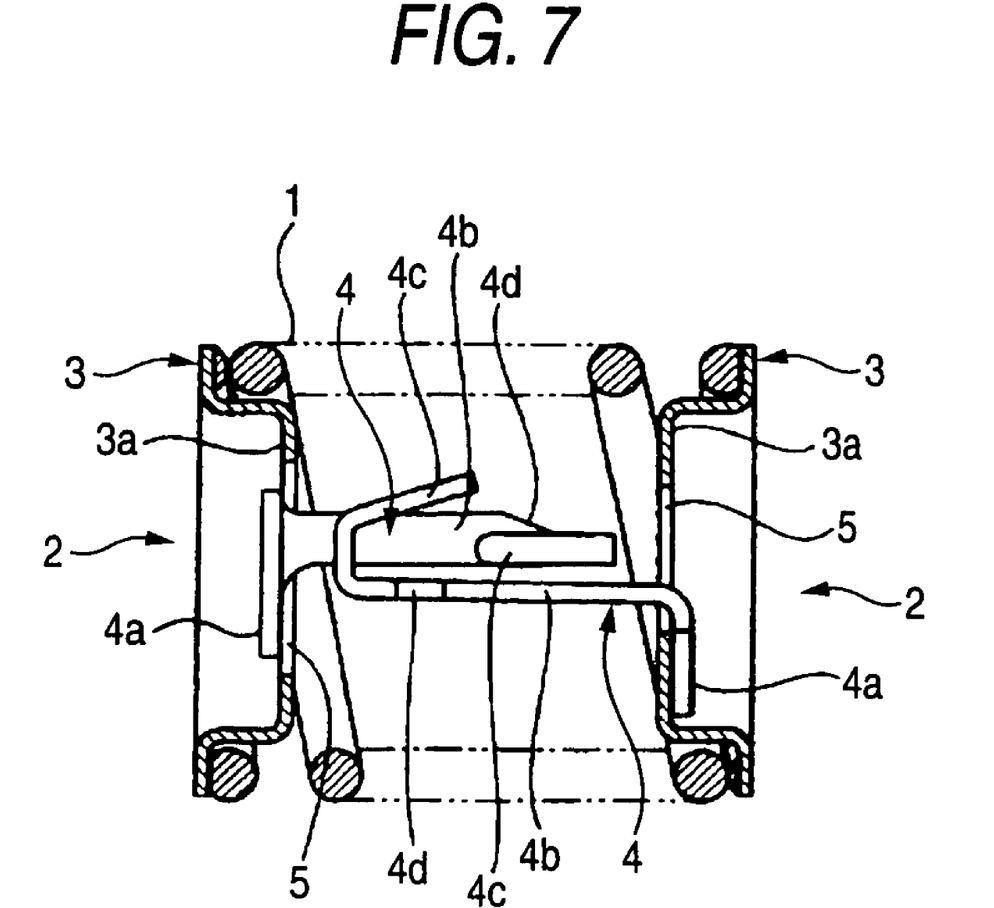
[FIG. 7] A cross-sectional view explanatory of a third stage of the assembling of the spring assembly.
Figure 8:
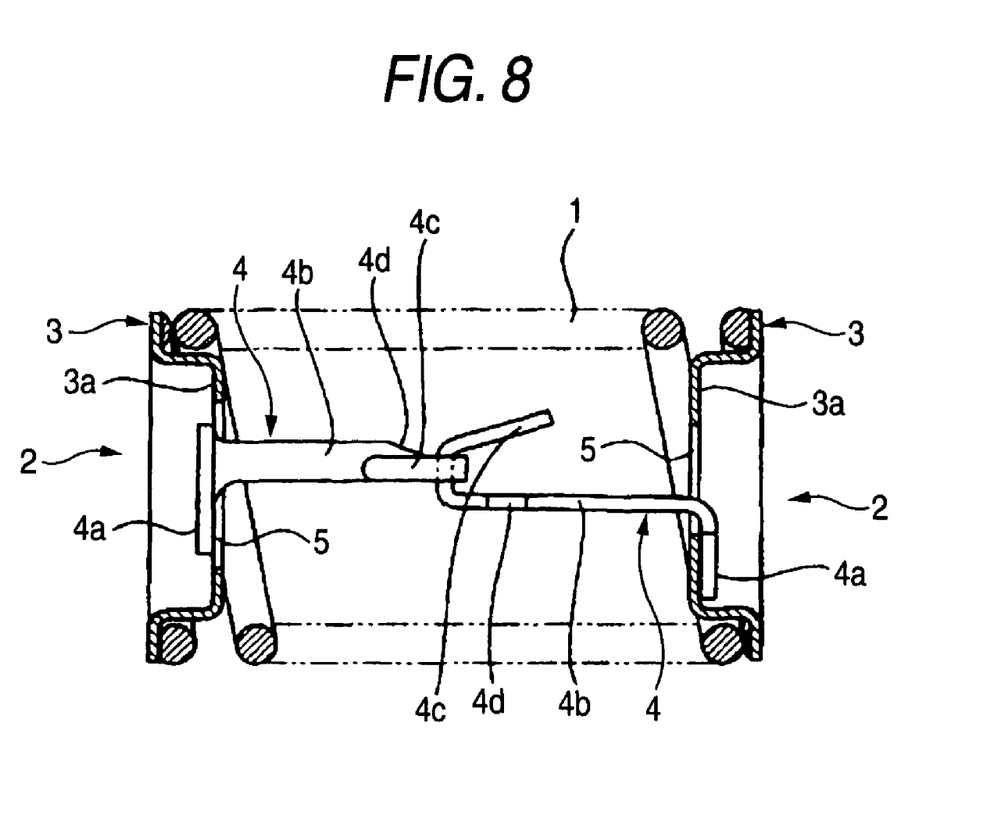
[FIG. 8] A cross-sectional view explanatory of a fourth stage of the assembling of the spring assembly.

Then, under a condition in which the compression coil spring 1 are compressed to a position where the turned-back portions 4c of the hook portions 4 pass each other, one of the retainers 2 is forcibly rotated through 90°, so that the turned-back portions 4c intersect each other as shown in FIG. 7, and thereafter when the compression of the compression coil spring 1 is released, one turned-back portion 4c and the other turned-back portion 4c are engaged with each other in intersecting relation to each other. Therefore, the distance between the pair of retainers 2 can be immediately regulated. As a result, the compression coil spring 1 is held in the condition in which its free length is shortened, and in this embodiment, the number of the constituent parts is reduced as much as possible, and also the assembling operation becomes easy as compared with the conventional structure, and in this connection the production cost can be made low.

And besides, under this spring assembly, in use, even when the compression coil spring 1 is compressed beyond the range of ½ of its free length, the turned-back portion 4c of each hook member 4 is inserted into the slot 5 in the plate member 5 opposed thereto, and therefore the turned-back portion 4c of the hook member 4 and the plate member 3 are prevented from inadvertently interfering with each other. Furthermore, the turned-back portion 4c of the hook member 4 extends in the direction of the shorter dimension of the slot 5, and in this connection, when one retainer 2 is rotated through 90° in the assembling operation, and the turned-back portions 4c are engaged with each other in intersecting relation, each turned-back portion 4c is disposed along the direction of the longer dimension of the slot 5 in the plate member 3 opposed thereto, and therefore even if the turned-back portion 4c is made as large as possible, this large turned-back portion 4c will not interfere with the plate member 3. Furthermore, the amount of engagement of the turned-back portions 4c with each other naturally increases, and therefore the turned-back portions 4c will not be easily disengaged from each other by an impact as when the dropping occurs. Incidentally, when the turned-back portion 4c is tapered to expand outward as illustrated, the turned-back portions will not interfere with each other during the operation of the spring assembly.

And besides, the turned-back portion 4c is narrower in plate width than the pillar portion 4b, and also its width narrowing direction is such that the turned-back portion is narrowed with the tapering shape 4d in the direction to be disposed close to the center axis of the compression coil spring 1. In this connection, even if the slot 5 formed through the plate member 3 is made small, the interference of the two 3 and 4c with each other can be more positively prevented, and also the point at which the turned-back portions 4c of the hook members 4 are engaged with each other in intersecting relation can be disposed as close to the center axis of the compression coil spring 1 as possible, and therefore the compression coil spring 1 can be held in the shortened condition in a proper posture without being buckled.

Industrial Applicability

In the spring assembly of the present invention, the number of the constituent parts can be reduced as much as possible, and besides the assembling operation becomes easy, and the production cost can be made low, and therefore the spring assembly is quite suitable for use in the accumulator serving as the hydraulic control element in the automatic transmission of the automobile or the like.

BRIEF DESCRIPTION OF THE DRAWINGS

[FIGS. 2A and 2B]

[FIGS. 3A to 3C]

[FIGS. 4A and 4B]

DESCRIPTION OF THE REFERENCE NUMERALS 1 compression coil spring (coil spring)
2 retainer
3 plate member
3a depressed central portion
4 hook member
4a welding piece portion
4b pillar portion
4c turned-back portion
4d tapering shape
5 slot (hole)

The invention claimed is:
1. A spring assembly comprising:
a coil spring; and
a pair of retainers disposed, respectively, at opposite end portions of the coil spring, wherein the retainers include:
a plate member abutting against the end portion of the coil spring and depressed at a central portion thereof toward an inside of the coil spring; and
a hook member fixed to the plate member so as to hold a free length of the coil spring shortened,
wherein the hook member includes:
a pillar portion depending from the plate member and extending into the inside of the coil spring; and
a turned-back portion turned back at a distal end of the pillar portion so as to be engaged with an other turned-back portion,
wherein a side of the pillar portion tapers inward toward an other side of the pillar portion such that a center of the turned-back portion is offset, in a width direction, from a center of a widest portion of the pillar portion.

2. The spring assembly according to claim 1, wherein a hole is formed through the depressed central portion of the plate member.

3. The spring assembly according to claim 2, wherein the hole in the plate member is formed into a slot-shape, and
wherein the turned-back portion of the hook member extends in a direction of a shorter dimension of the hole.

4. The spring assembly according to claim 2, wherein the hook member is formed by bending a metal plate,
wherein the turned-back portion comprises a plate width less than a plate width of the pillar portion, and
wherein a width narrowing direction is such that the turned-back portion is narrowed in a direction towards a center axis of the coil spring.

5. The spring assembly according to claim 1,
wherein the plate member includes a slot-shaped hole formed through the depressed central portion thereof,
wherein the turned-back portion of the hook member is extended in a direction of a shorter dimension of the hole,
wherein the hook member is formed by bending a metal plate;
wherein the turned-back portion comprises a plate width less than a plate width of the pillar portion, and
wherein a width narrowing direction is such that the turned-back portion is narrowed in a direction towards a center axis of the coil spring.

6. A spring assembly comprising:
a coil spring; and
a pair of retainers disposed, respectfully, at opposite end portions of the coil spring,
wherein the retainers include:
a plate member abutting against the end portion of the coil spring and depressed at a central portion thereof toward an inside of the coil spring; and
a hook member fixed to the plate member so as to hold a free length of the coil spring shortened,
wherein the hook member includes:
a pillar portion depending from the plate member and extending into the inside of the coil spring; and
a turned-back portion turned back at a distal end of the pillar portion so as to be engaged with an other turned-back portion,
wherein a side of the pillar portion tapers inward toward an other side of the pillar portion such that a center of the turned-back portion is offset, in a width direction, from a center of a widest portion of the pillar portion.

7. A spring assembly comprising;
a coil spring; and
a pair of retainers disposed respectively at opposite end portions of the coil spring,
wherein the retainers include:
a plate member abutting against the end portion of the coil spring and depressed at a central portion thereof toward an inside of the coil spring; and
a hook member fixed to the plate member so as to hold a free length of the coil spring shortened,
wherein the hook member includes:
a pillar portion depending from the plate member and extending into the inside of the coil spring; and
a turned-back portion turned back at distal end of the pillar portion so as to be engaged with an other turned-back portion,
wherein the hook members are inserted in opposite directions in the inside of the coil spring respectively from the opposite end portions thereof with the turned-back portions facing in the same direction, the plate members are caused to abut respectively against the opposite end portions of the coil spring from outer sides thereof, thereafter the coil spring is compressed, one of the retainers is forcibly rotated through 90°, and thereafter the compression of the coil spring is released so as to engage one turned-back portion and the other turned-back portion in interesting relation to each other, and
wherein a side of the pillar portion tapers inward toward an other side of the pillar portion such that a center of the turned-back portion is offset, in a width direction, from a center of a widest portion of the pillar portion.

8. The spring assembly according to claim 1, wherein, when the hook member is engaged, the pillar portion and turned-back portion of the hook member face perpendicularly to one another.

9. The spring assembly according to claim 1,
wherein the hook member is formed by bending a metal plate, the metal plate including two plate faces and two side faces.

10. The spring assembly according to claim 9,
wherein, as viewed from a center axis of the coil spring, two symmetrical regions are defined with the center axis as a center,
wherein at least a tip portion of the pillar portion and a whole portion of the turned-back portion of a retainer of the pair of retainers are disposed within one of the two symmetrical regions, and
wherein, when assembling the retainer with an other retainer of the pair of retainers, the tip portion of the pillar portion and the whole portion of the turned-back portion of the other retainer are disposed within the other one of the two symmetrical regions.

11. The spring assembly according to claim 6,
wherein the hook member is formed by bending a metal plate, the metal plate having two plate faces and two side faces.

12. The spring assembly according to claim 11,
wherein, as viewed from a center axis of the coil spring, two symmetrical regions are defined with the center axis as a center,
wherein at least a tip portion of the pillar portion and a whole portion of the turned-back portion of a retainer of the pair of retainers are disposed within one of the two symmetrical regions, and
wherein, when assembling the retainer with an other retainer of the pair of retainers, the tip portion of the pillar portion and the whole portion of the turned-back portion of the other retainer are disposed within the other one of the two symmetrical regions.

* * * * *